(12) United States Patent
Shimizu et al.

(10) Patent No.: US 12,197,391 B2
(45) Date of Patent: Jan. 14, 2025

(54) FILE STORAGE SYSTEM AND FILE TRANSFER METHOD

(71) Applicant: Hitachi, Ltd., Tokyo (JP)

(72) Inventors: Tomoki Shimizu, Tokyo (JP); Hoshun Terazumi, Tokyo (JP); Shinji Ogasawara, Tokyo (JP); Takeshi Kitamura, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 65 days.

(21) Appl. No.: 18/170,031

(22) Filed: Feb. 16, 2023

(65) Prior Publication Data

US 2024/0020276 A1 Jan. 18, 2024

(30) Foreign Application Priority Data

Jul. 15, 2022 (JP) .................. 2022-114159

(51) Int. Cl.
*G06F 16/00* (2019.01)
*G06F 16/13* (2019.01)
*G06F 16/176* (2019.01)

(52) U.S. Cl.
CPC .......... *G06F 16/1774* (2019.01); *G06F 16/13* (2019.01)

(58) Field of Classification Search
None
See application file for complete search history.

(56) References Cited

U.S. PATENT DOCUMENTS

| | | | |
|---|---|---|---|
| 8,131,281 B1* | 3/2012 | Hildner | H04L 63/30 455/418 |
| 2005/0076177 A1* | 4/2005 | Mori | G06F 12/0868 711/E12.019 |
| 2006/0129631 A1* | 6/2006 | Na | H04L 9/40 709/203 |
| 2012/0102154 A1* | 4/2012 | Huang | H04L 67/06 709/219 |
| 2012/0296946 A1* | 11/2012 | Goto | H04L 67/06 707/827 |
| 2013/0185509 A1* | 7/2013 | Golosovker | G06F 9/4856 711/162 |
| 2013/0211770 A1* | 8/2013 | Dresler | G06F 11/26 702/123 |
| 2014/0101115 A1* | 4/2014 | Ko | G06F 16/17 707/692 |
| 2014/0136485 A1* | 5/2014 | Miyoshi | G06F 3/0664 707/654 |
| 2015/0089028 A1* | 3/2015 | Zheng | H04L 67/55 709/219 |
| 2015/0339487 A1* | 11/2015 | Nomura | G06F 21/62 726/27 |
| 2017/0034237 A1* | 2/2017 | Silver | H04N 5/272 |
| 2020/0265023 A1* | 8/2020 | Tomar | G06F 16/185 |
| 2021/0072870 A1* | 3/2021 | Arnold | H04L 67/06 |

(Continued)

FOREIGN PATENT DOCUMENTS

JP 2021-157381 A 10/2021

*Primary Examiner* — Hasanul Mobin
(74) *Attorney, Agent, or Firm* — Foley & Lardner LLP

(57) ABSTRACT

When a transfer target file is updated during multiple part upload of the transfer target file to an external storage system, a file storage system stops the multiple part upload of the transfer target file, and performs multiple part upload of the updated file to the external storage system.

9 Claims, 12 Drawing Sheets

(56) References Cited

U.S. PATENT DOCUMENTS

| | | |
|---|---|---|
| 2021/0303158 A1 | 9/2021 | Nomura et al. |
| 2022/0300452 A1* | 9/2022 | Diehl .................... H04L 9/3239 |
| 2024/0020276 A1* | 1/2024 | Shimizu .................. G06F 16/13 |

* cited by examiner

FIG. 4

FILE INFORMATION 410

| FILE IDENTIFIER | FILE STATE |
|---|---|
| a | Clean |

FILE PART INFORMATION 420

| START OFFSET | LENGTH | PART STATE |
|---|---|---|
| 0 MB | 5 MB | Clean |
| 5 MB | 5 MB | Dirty |
| 10 MB | 5 MB | Dirty |

| PART NUMBER | START OFFSET | LENGTH | HASH VALUE |
|---|---|---|---|
| 1 | 0 MB | 5 MB | aaa |
| 2 | 5 MB | 5 MB | bbb |
| 3 | 10 MB | 5 MB | ccc |

FILE STORAGE SYSTEM AND FILE TRANSFER METHOD

BACKGROUND

The present invention generally relates to file transfer.

File transfer is performed to store files in a file storage system into an external storage system. Techniques pertaining to file transfer include, for example, a technique disclosed in PTL 1.

CITATION LIST

Patent Literature

[PTL 1] Japanese Patent Laid-Open No. 2021-157381

SUMMARY

Multiple part upload of a file has been known. Multiple part upload is sometimes called MPU. Hereinafter, for convenience sake, multiple part upload will be referred to as "MPU".

It is assumed that MPU from a file storage system (hereinafter, called a file storage) to a cloud object storage system (hereinafter, called a cloud storage) is performed. It is also assumed that during MPU, in the file storage, update of a transferred part and a non-transferred part in a file being transferred occurs in one update transaction. In this case, when the updated non-transferred part is transferred to the cloud storage, for one update transaction, the part having not been updated yet and the part having already been updated mixedly exist in the cloud storage. If these parts were concatenated in the cloud storage, an object without consistency in data would thus be created.

As a method for solving the problem, a method is conceivable that obtains a lock of the transfer target file before the transfer is started and maintains the lock until the transfer is finished. However, during the lock being maintained, the file is not allowed to be updated. That is, a long update disabled time of the file occurs.

A method is also conceivable that obtains the lock of the file, then copies the file and releases the lock, and transfers the copied file. According to this method, the original unlocked file may be updated. However, the lock of the file is maintained during copying, and a long time is required for copying depending on a certain file size. Accordingly, even this method can cause a long update disabled time.

When a transfer target file is updated during multiple part upload of the transfer target file to an external storage system, a file storage system stops the multiple part upload of the transfer target file, and performs multiple part upload of the updated file to the external storage system.

According to the present invention, multiple part upload can be realized that can achieve both maintenance of consistency of data at a transfer destination and prevention of occurrence of a long update disabled time of a file being transferred at a transfer source.

BRIEF DESCRIPTION OF THE DRAWINGS

FIG. 4 shows a configuration example of an I/O information;

FIG. 5 shows a configuration example of part management information;

DESCRIPTION OF EMBODIMENTS

Figure 1:
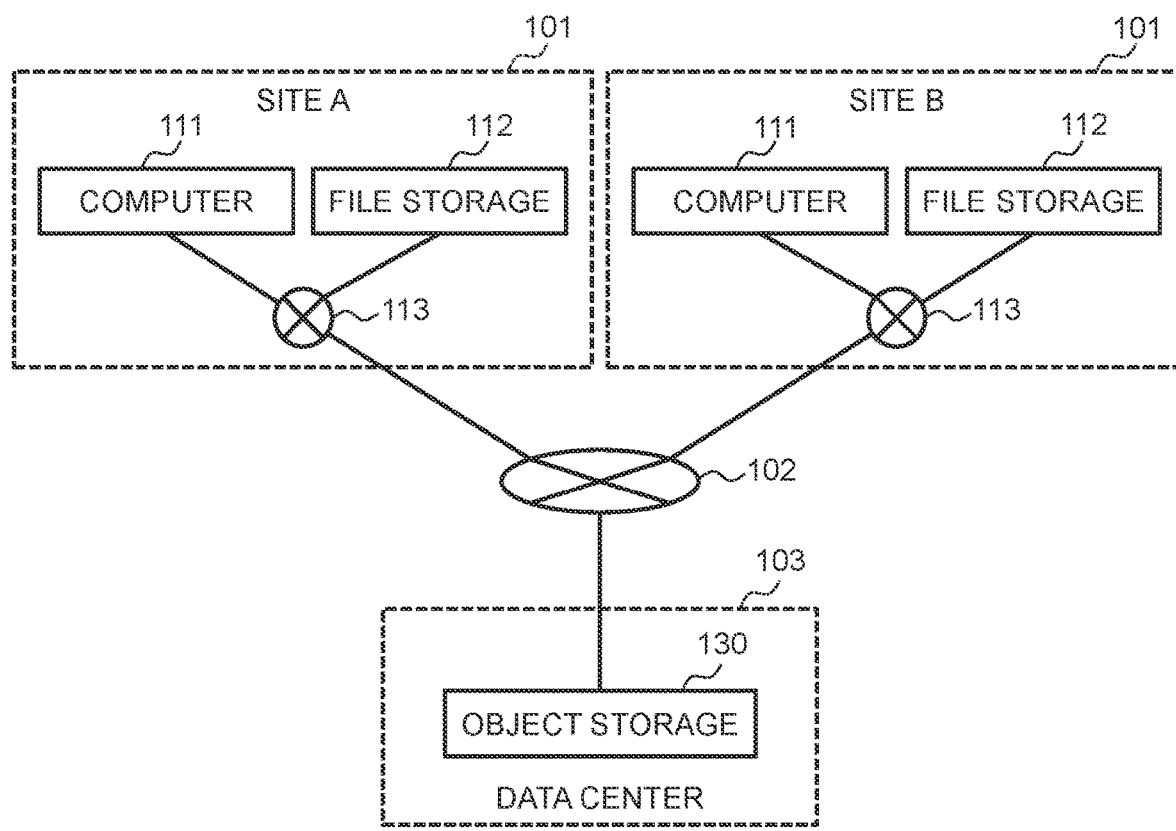
FIG. 1 shows a configuration example of an entire system according to an embodiment.

In the following description, "interface apparatus" may be one or more interface devices. The one or more interface devices may be at least one of the followings:

I/O interface apparatus that is one or more I/O (Input/Output) interface devices. The I/O (Input/Output) interface device is an interface device for at least one of the I/O device and a remote display computer. The I/O interface device for the display computer may be a communication interface device. At least one I/O device may be a user interface device, for example, any of input devices, such as a keyboard and a pointing device, and output devices, such as a display device.

Communication interface apparatus, such as one or more communication interface devices. The one or more communication interface devices may be one or more communication interface devices of the same type (e.g., one or more NICs (Network Interface Cards)), or two or more communication interface devices of different types (e.g., an NIC and an HBA (Host Bus Adapter)).

In the following description, "memory" is one or more memory devices that are an example of one or more storage devices, and typically, a main storage device. At least one memory device of the memories may be a volatile memory device or a non-volatile memory device.

In the following description, "persistent storage apparatus" is one or more persistent storage devices that are an example of one or more storage devices. Typically, the persistent storage device may be a non-volatile storage device (e.g., an auxiliary storage device), and specifically, for example, an HDD (Hard Disk Drive), an SSD (Solid State Drive), an NVME (Non-Volatile Memory Express) drive or an SCM (Storage Class Memory).

In the following description, "storage apparatus" may refer to at least the memory of the memory and the persistent storage apparatus.

In the following description, "processor" may be one or more processor devices. Typically, at least one processor device may be a microprocessor device, such as a CPU (Central Processing Unit), or may be another type of processor device, such as a GPU (Graphics Processing Unit). At least one processor device may be a single core one or a multi-core one. At least one processor device may be a processor core. At least one processor device may be a processor device in a broad sense, such as a circuit that is an aggregate of gate arrays through a hardware description language for performing part of or the entire processing (e.g., an FPGA (Field-Programmable Gate Array), a CPLD (Complex Programmable Logic Device) or an ASIC (Application Specific Integrated Circuit)).

In the following description, data on which an output is obtained for an input is sometimes described. However, the data may be data having any structure (e.g., structured data or unstructured data), or a learning model that generates an output for an input and is typified by a neural network, a genetic algorithm, and a random forest.

In the following description, functions are sometimes described with representation of a file system unit, an I/O monitor, a replicator and an object system unit. Alternatively, the functions may be achieved by one or more computer programs being executed by a processor, by one or more hardware circuits (e.g., an FPGA or an ASIC), or by a combination of these items. In the case where the functions are achieved by the programs being executed by the processor, defined processes are performed appropriately using a storage apparatus and/or an interface apparatus. Accordingly, each function may be at least part of the processor. The process described as a subject may be a process performed by a processor or an apparatus that includes the processor. The program may be installed from a program source. The program source may be, for example, a program distributing computer or a computer-readable storage medium (e.g., a non-volatile storage medium). The description of each function is an example. Multiple functions may be integrated in one function, or one function may be divided into multiple functions.

Hereinafter, one embodiment of the present invention is described with reference to the drawings.

FIG. 1 shows a configuration example of an entire system according to an embodiment of the present invention.

One or more sites 101, and one data center 103 are coupled by a communication network 102 (e.g., the Internet or a WAN (Wide Area Network)).

The site 101 is an example of a local site, and includes a computer 111 and a file storage 112 that are coupled to a communication network 113 (e.g., a LAN (Local Area Network)). The file storage 112 is an abbreviation of a file storage system, and performs I/O of a file in response to an I/O request issued by the computer 111. The file storage 112 may be, for example, a server. The computer 111 may be, for example, a client.

The data center 103 is an example of a remote site, and includes an object storage 130. The object storage 130 is an abbreviation of an object storage system, and includes, for example, a cloud storage (a storage provided based on a cloud infrastructure). The object storage 130 is an example of an external storage system. The external storage system may be a file storage other than the file storage 112, instead of the object storage 130.

The file storage 112 transfers a file to the object storage 130 via the communication networks 113 and 102.

Figure 2:
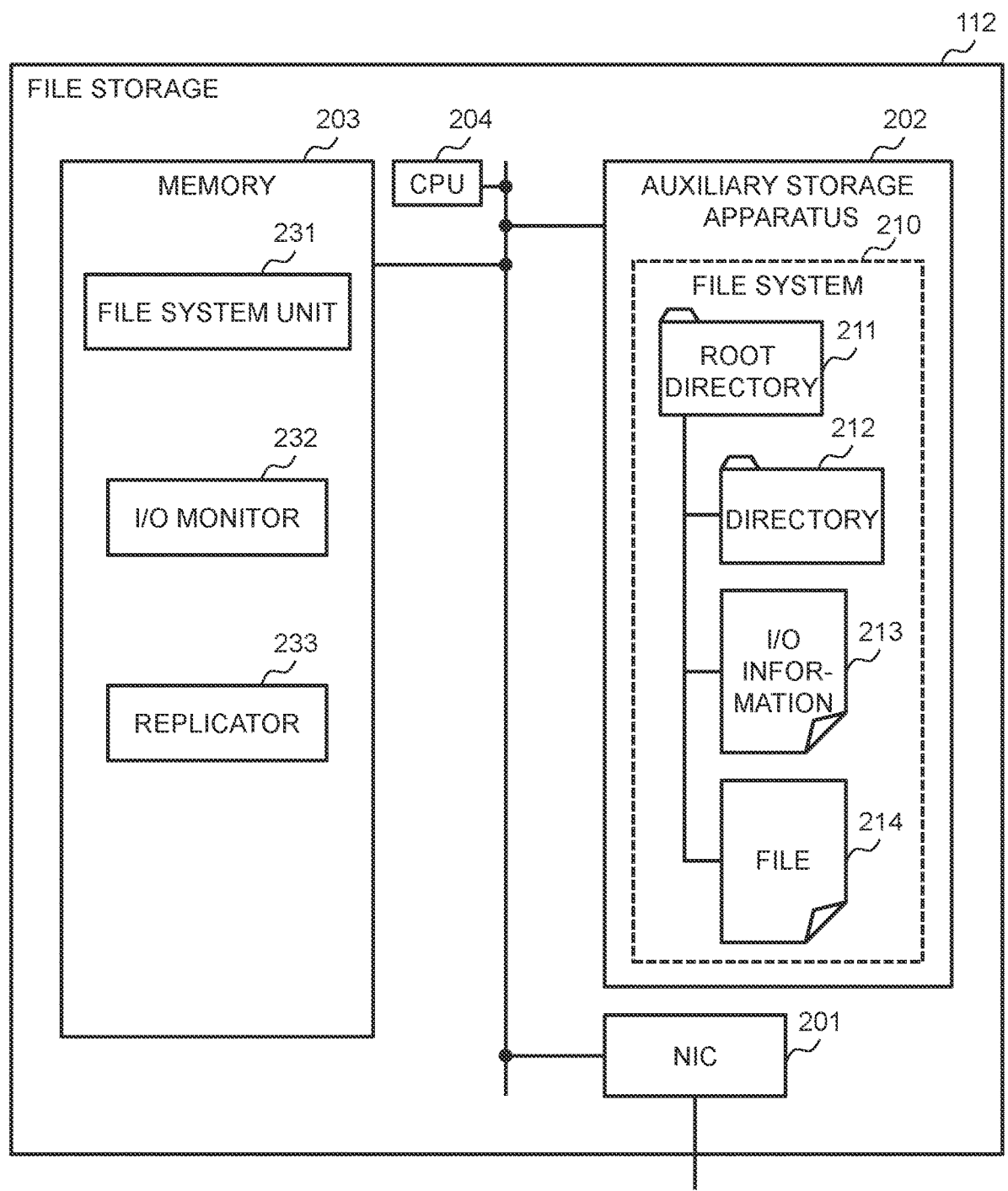
FIG. 2 shows a configuration example of a file storage.

FIG. 2 shows a configuration example of the file storage 112.

In this embodiment, the file storage 112 is a physical computer system (one or more physical computers). Instead, a logical computer system (e.g., a virtual machine) based on a physical computer system may be adopted.

The file storage 112 includes an NIC (Network Interface Card) 201, an auxiliary storage apparatus 202, a memory 203, and a CPU 204 connected to these components. The NIC 201 is an example of an interface apparatus. Each of the auxiliary storage apparatus 202 and the memory 203 is an example of a storage apparatus. The CPU 204 is an example of a processor.

The communication network 113 is coupled to the NIC 201. Files are transferred through the NIC 201.

Storage spaces based on the auxiliary storage apparatus 202 include a file system 210. The file system 210 includes a root directory 211. In the file system 210, a directory 212, I/O information 213, and a file 214 are stored under the root directory 211.

The I/O information 213 may be information common to a plurality of files 214 (including pieces of information for the respective files). However, in this embodiment, the I/O information 213 is provided for each file 214. That is, the file 214 and the I/O information 213 correspond to each other on a one-to-one basis. The I/O information 213 includes information that represents a file state (e.g., "Clean", "Dirty", etc.).

The memory 203 stores a plurality of programs. At least one of the programs is executed by the CPU 204, thereby achieving functions, such as of a file system unit 231, an I/O monitor 232 (an example of an I/O monitoring unit), and a replicator 233 (an example of a file transfer unit).

In response to an I/O request for a file, the file system unit 231 performs I/O for the file system 210 (for example, reads a file from the file system 210, newly writes a file into the file system 210, or updates a file in the file system 210). The issuer of the I/O request for the file may be the computer 111, or an application or the like (an upper element of the file system unit 231) in the file storage 112.

The I/O monitor 232 monitors I/O of the file. The replicator 233 performs MPU of the file to the object storage 130.

Figure 3:
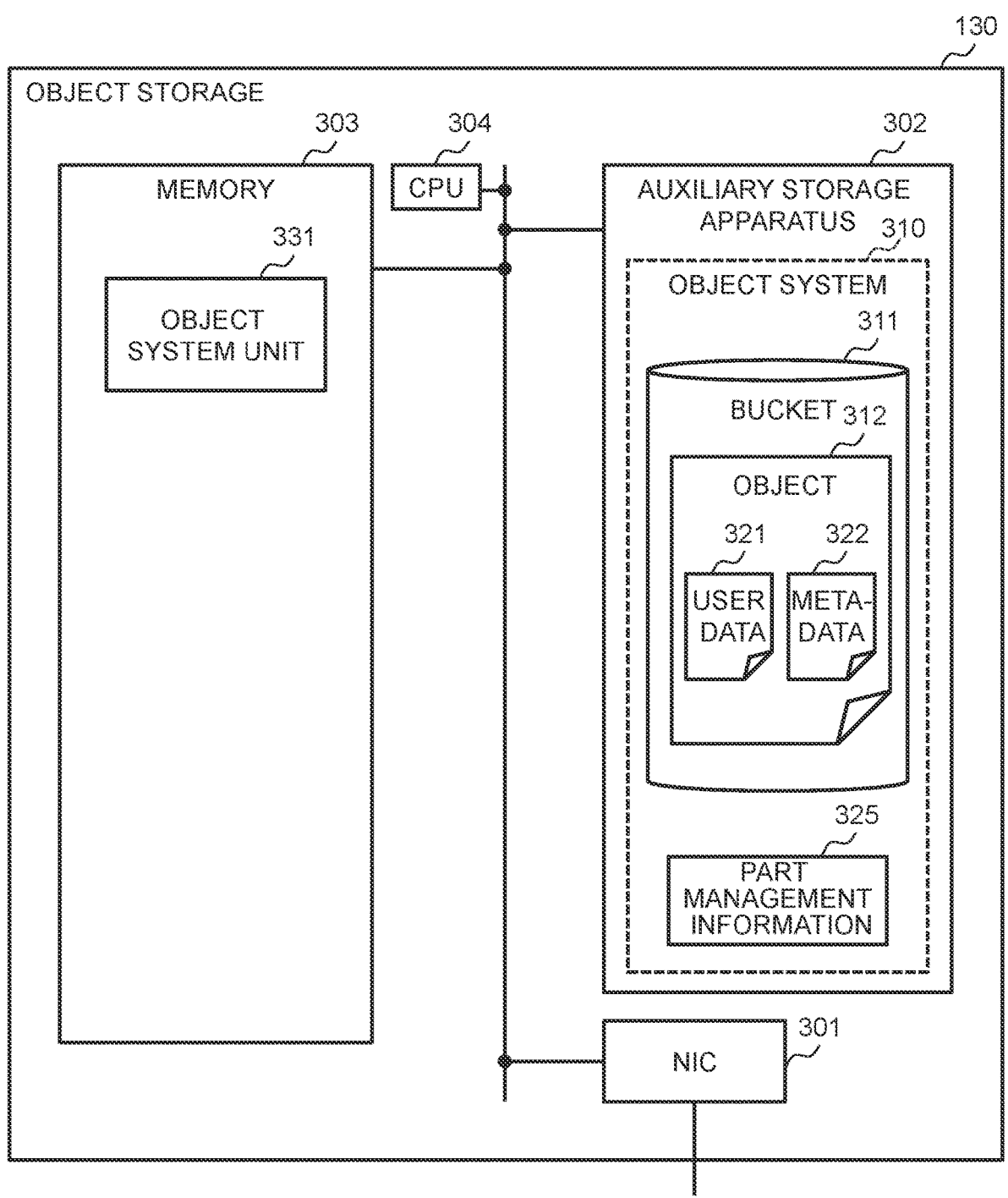
FIG. 3 shows a configuration example of an object storage.

FIG. 3 shows a configuration example of the object storage 130.

In this embodiment, the object storage 130 is a physical computer system. Instead, a logical computer system (e.g., a cloud computing service) based on a physical computer system may be adopted.

The object storage 130 includes an NIC 301, an auxiliary storage apparatus 302, a memory 303, and a CPU 304 coupled to these components. The NIC 301 is an example of an interface apparatus. Each of the auxiliary storage apparatus 302 and the memory 303 is an example of a storage apparatus. The CPU 304 is an example of a processor.

The communication network 113 is coupled to the NIC 301. A part of a file is transmitted and received through the NIC 301.

Storage spaces based on the auxiliary storage apparatus 302 include an object system 310. A packet 311 is stored in the object system 310. The packet 311 includes an object 312. The object 312 includes user data 321 and metadata 322. The user data 321 corresponds to data on the file (specifically, data restored by concatenating multiple parts that constitute the file). The metadata 322 includes data for management pertaining to the user data 321. The file and the object 312 may correspond to each other on a one-to-one basis, multiple-to-one basis, or one-to-multiple basis.

Part management information 240 that includes information on each part (a part of the file) received from the file storage 112 is stored in the auxiliary storage apparatus 302 (or the memory 303). The part management information 240 may be information common to a plurality of files (including a piece of information for each part on a part-by-part basis). However, in this embodiment, part management information 325 is provided for each file. That is, the file and the part management information 325 correspond to each other on a one-to-one basis.

The memory 303 stores a plurality of programs. At least one of these programs is executed by the CPU 304, thereby achieving a function, such as of an object system unit 331. During MPU of the file, the object system unit 331 receives the file on a part-by-part basis, and stores the received part in the memory 303 (or the auxiliary storage apparatus 302). The object system unit 331 restores data on the file by concatenating all the parts of the file. The object system unit 331 generates the object 312 that includes the user data 321 (data on the restored file) and the metadata 322, and stores the object 312 in the object system 310.

FIG. 4 shows a configuration example of the I/O information 213.

In the file storage 112, the I/O information 213 includes file information 410 and file part information 420, with respect to the file corresponding to the I/O information 213. The file information 410 represents the identifier (e.g., a file path name) of the file and the file state. The file part information 420 represents a start offset that is an offset of the beginning of a part from the beginning of the file, the length that is the data length of the part, and a part state that is the state of the part, with respect to each part of the file.

FIG. 5 shows a configuration example of the part management information 325.

In the object storage 130, the part management information 325 represents the identification number of the part, the start offset that is the offset of the beginning of the part from the beginning of the file, the length that is the data length of the part, and a hash value (an example of a summary of the part) of the part, with respect to each file part received by the object storage 130, for the file corresponding to the information 325.

Figure 6:
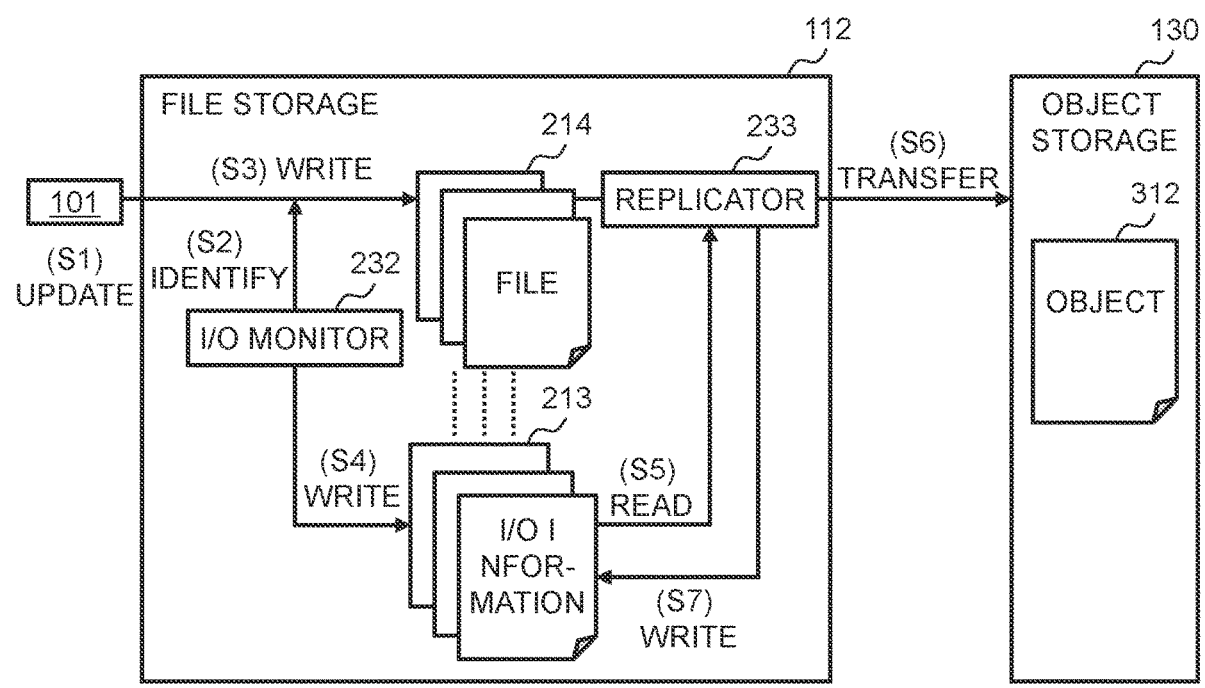
FIG. 6 shows an example of cooperation between an I/O monitor and a replicator.

FIG. 6 shows an example of cooperation between the I/O monitor 232 and the replicator 233.

The I/O monitor 232 monitors I/O of each file 214. When an update request (an example of an I/O request) for the file 214 is received by the file storage 112 from the computer 111 (S1), the I/O monitor 232 identifies update of the file 214 designated by the update request (S2), and the file system unit 231 updates the file 214 in response to the update request (S3). The I/O monitor 232 updates the I/O information 213 corresponding to the file 214 designated by the update request, if required (S4). For example, if the file state is "Clean", the file state is updated from "Clean" to "Dirty".

The replicator 233 periodically reads the I/O information 213 on the file 214 (S5), transfers the file corresponding to the I/O information 213 to the object storage 130 if the file state represented by the I/O information 213 is "Dirty" (S6), and updates the file state to "Clean" (S7).

As described above, the I/O monitor 232 and the replicator 233 can cooperate with each other through the I/O information 213. Update of the I/O information 213 (file state) by the I/O monitor 232 in response to update of the file 214, and transfer of the file by the replicator 233 in accordance with the file state are performed in parallel.

In this embodiment, file transfer is MPU. Besides "Clean" (transferred) and "Dirty" (non-transferred), the file states include "More Dirty" meaning that retransfer is required because update is made during MPU.

Figure 7:
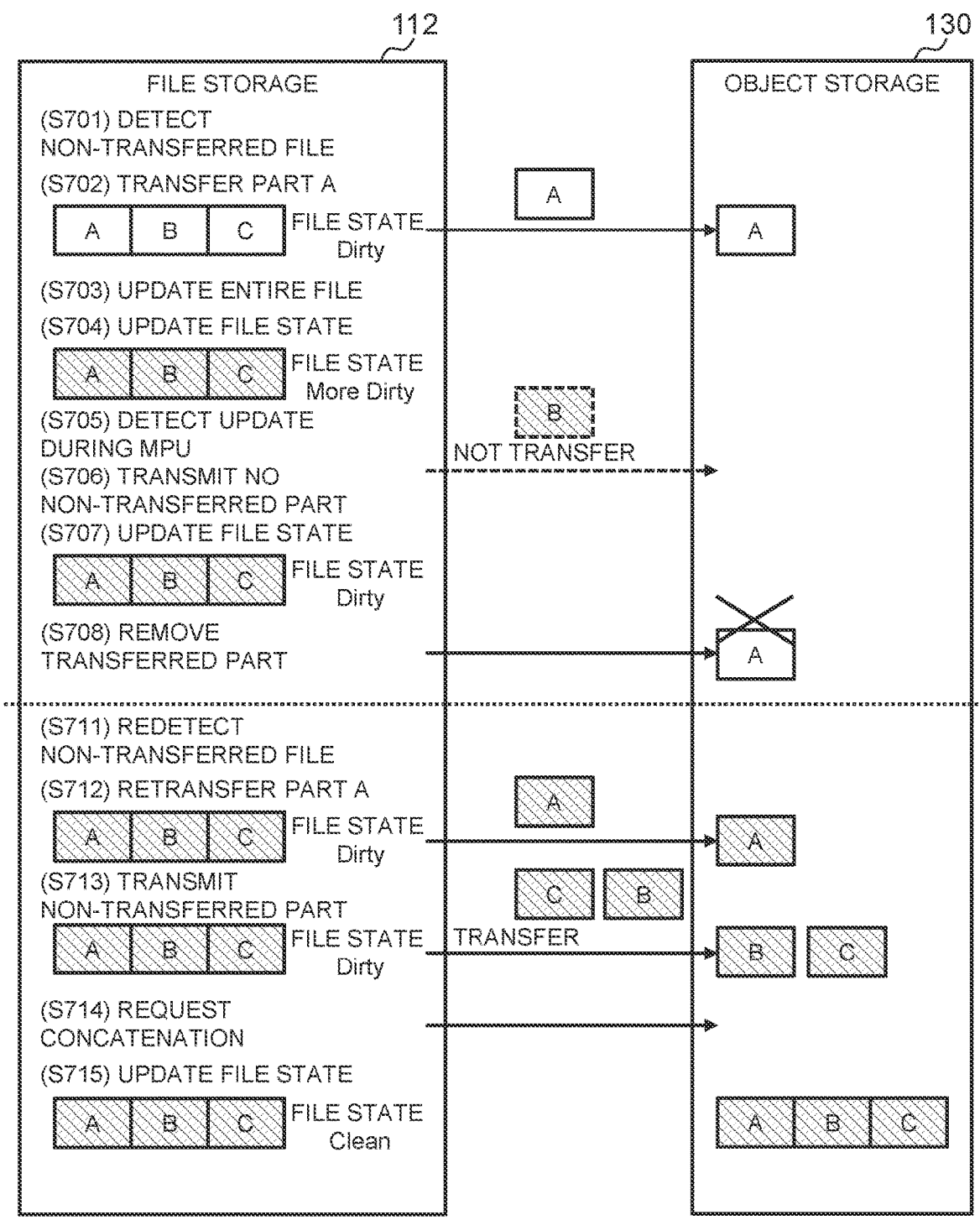
FIG. 7 schematically shows an overview example of MPU according to an embodiment.

FIG. 7 schematically shows an overview example of MPU according to the embodiment.

The replicator 233 detects a file in the file state "Dirty", i.e., a non-transferred file (S701). The file detected here is called "target file" in the description with reference to FIG. 7. The target file is an example of a transfer target file.

The replicator 233 starts MPU of the target file, and transfers a part A of the target file to the object storage 130 (S702). It may be configured that in MPU the replicator 233 sequentially transfers the parts from the beginning part of the target file. When MPU of the target file is started, the replicator 233 notifies the I/O monitor 232 of the start of MPU of the target file through or without intervention of the I/O information 213 on the target file. The notified I/O monitor 232 recognizes the start of MPU of the target file. For example, the I/O information 213 on the target file may include a value meaning the start of MPU, and the I/O monitor 232 may recognize the start of MPU of the target file by detecting the value.

It is assumed that the entire target file is updated (S703). Upon detection of update of the target file, the I/O monitor 232 having detected the start of MPU of the target file updates the file state of the target file to "More Dirty" (S704).

The replicator 233 is configured to verify the file state of the target file every time the part of the file is transferred. Accordingly, before transfer of a part B subsequent to the part A, the replicator 233 verifies the file state of the target file, thus detecting the file state "More Dirty" before transferring the part B (S705). In this case, the replicator 233 does not transfer the part B (S706). That is, the replicator 233 stops MPU of the target file.

The replicator 233 (or the I/O monitor 232) then updates the file state of the target file to "Dirty" (S707). The replicator 233 causes the object storage 130 to remove the transferred part A (S708).

In S707, the file state of the target file is updated to "Dirty". Accordingly, the target file is then subjected to MPU again (S711), and MPU of the target file is started, thus transferring the part A (S712). Unless the target file is updated during MPU of the target file (unless the file state of the target file is updated to "More Dirty"), MPU of the target file is continued. When all the parts other than the part A in the target file are transferred to the object storage 130 (S713), the replicator 233 requests file concatenation from the object storage 130 (S714). In response to the request, the received parts A to C are concatenated in the object storage 130. As a result, the target file is restored. Subsequently, the replicator 233 (or the I/O monitor 232) updates the file state of the target file to "Clean" (S715).

As described above, if the target file is updated during MPU, MPU of the target file is stopped, and after the target file is updated, MPU of the target file is performed. Accordingly, the consistency of data in the object storage 130 can be maintained, and a long update disabled time of the target file during MPU can be prevented from occurring in the file storage 112.

Specifically, in this embodiment, besides "Dirty" (an example of a first dirty state), "More Dirty" (an example of a second dirty state) is prepared as a file state. A "Dirty" file is the target file, for which MPU is started. The target file can be updated even during MPU. When the target file is updated during MPU, the file state is updated by the I/O monitor 232 to "More Dirty". For each part of the target file, the replicator 233 performs state determination that is determination of whether the file state of the target file is "More Dirty" or not. If the result of the state determination is false, the part is transferred to the object storage 130. If the result of the state determination is true, MPU of the target file is stopped. By such types and update of the file states and cooperation between the I/O monitor 232 and the replicator 233, the consistency of data in the object storage 130 can be maintained, and a long update disabled time of the target file during MPU can be prevented from occurring in the file storage 112.

Figure 8:
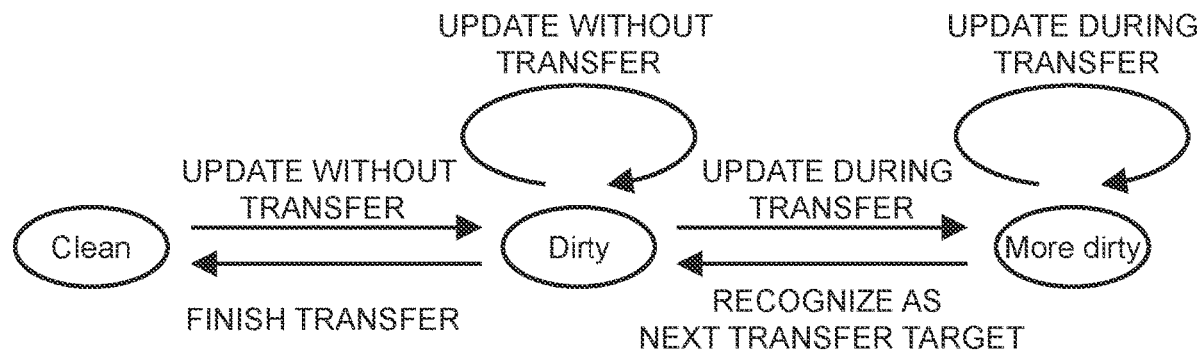
FIG. 8 shows file state transition according to an embodiment.

FIG. 8 shows file state transition according to the embodiment.

The file in the file state "Clean" is updated, and then the file state is updated to "Dirty". The file in the file state "Dirty" becomes the target of MPU.

After MPU of the file in the file state "Dirty" is completed, the file state is returned to "Clean".

Upon update of the file in the file state "Dirty", the file state is left "Dirty" when the file is not in MPU, but the file state is updated to "More Dirty" when the file is in MPU.

MPU of the file in the file state "More Dirty" is stopped, and subsequently the file state is returned to "Dirty". That is, the file is subjected to MPU again.

Figure 9:
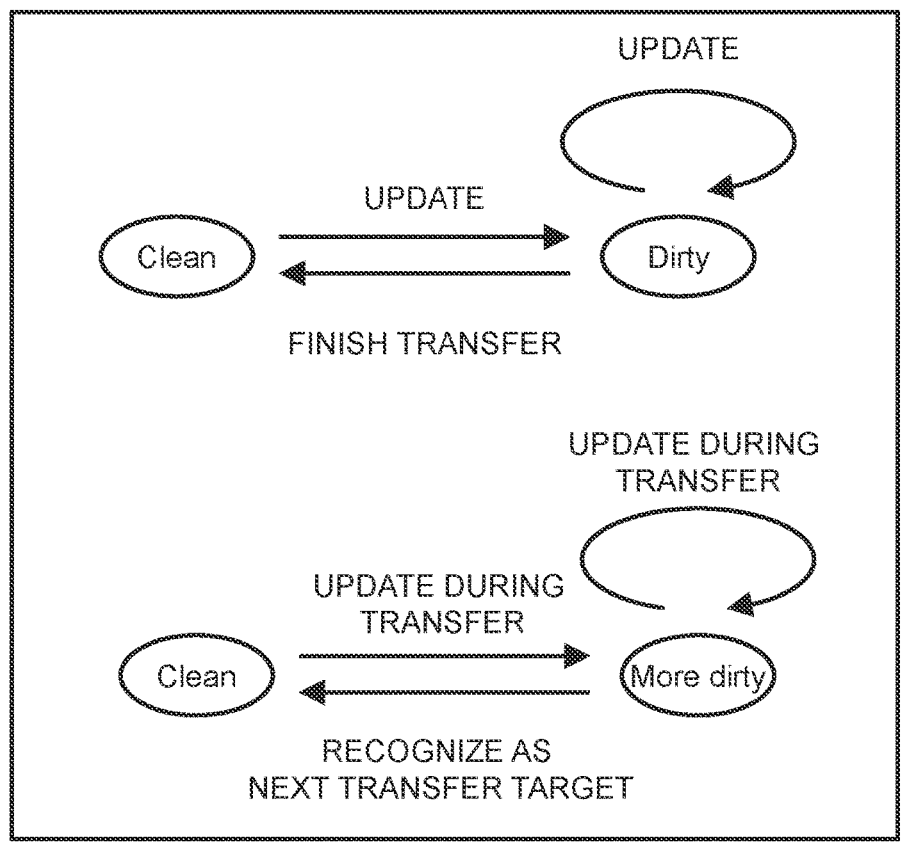
FIG. 9 shows file state transition according to a modification example.

FIG. 9 shows file state transition according to a modification example.

Common points between the file state transition exemplified in FIG. 9 and the file state transition exemplified in FIG. 8 are as follows:

When the file in the file state "Clean" is updated, the file state is updated to "Dirty".

After MPU of the file in the file state "Dirty" is completed, the file state is returned to "Clean".

Upon update of the file in the file state "Dirty", the file state is updated to "More Dirty" when the file is in MPU.

On the other hand, different points between the file state transition exemplified in FIG. 9 and the file state transition exemplified in FIG. 8 are as follows:

The file state "Clean" after transition in the case where MPU of the file in the file state "Dirty" is completed is assumed as a first type of "Clean", while there is a second type of "Clean" meaning a target of repeated MPU because of occurrence of update during MPU. Since the second type of "Clean" means a MPU target, this type can be another example of the first dirty state.

Thus, after MPU of the file in the file state "More Dirty" is stopped, the file state transitions to the second type of "Clean" instead of "Dirty".

After MPU of the file in the file state that is the second type of "Clean" is completed, the file state is returned to the first type of "Clean". On the other hand, upon update of the file in the file state that is the second type of "Clean", the file state transitions to "More Dirty" when the file is in MPU.

The examples of the file state transition need not be limited to the examples in FIGS. 8 and 9.

Hereinafter, referring to FIGS. 10 to 14, an example of processes performed in this embodiment is described. For the sake of description, the processes performed in this embodiment are classified into a start process, a transfer process, a concatenation confirmation process, a post-process, and a stop process.

Figure 10:
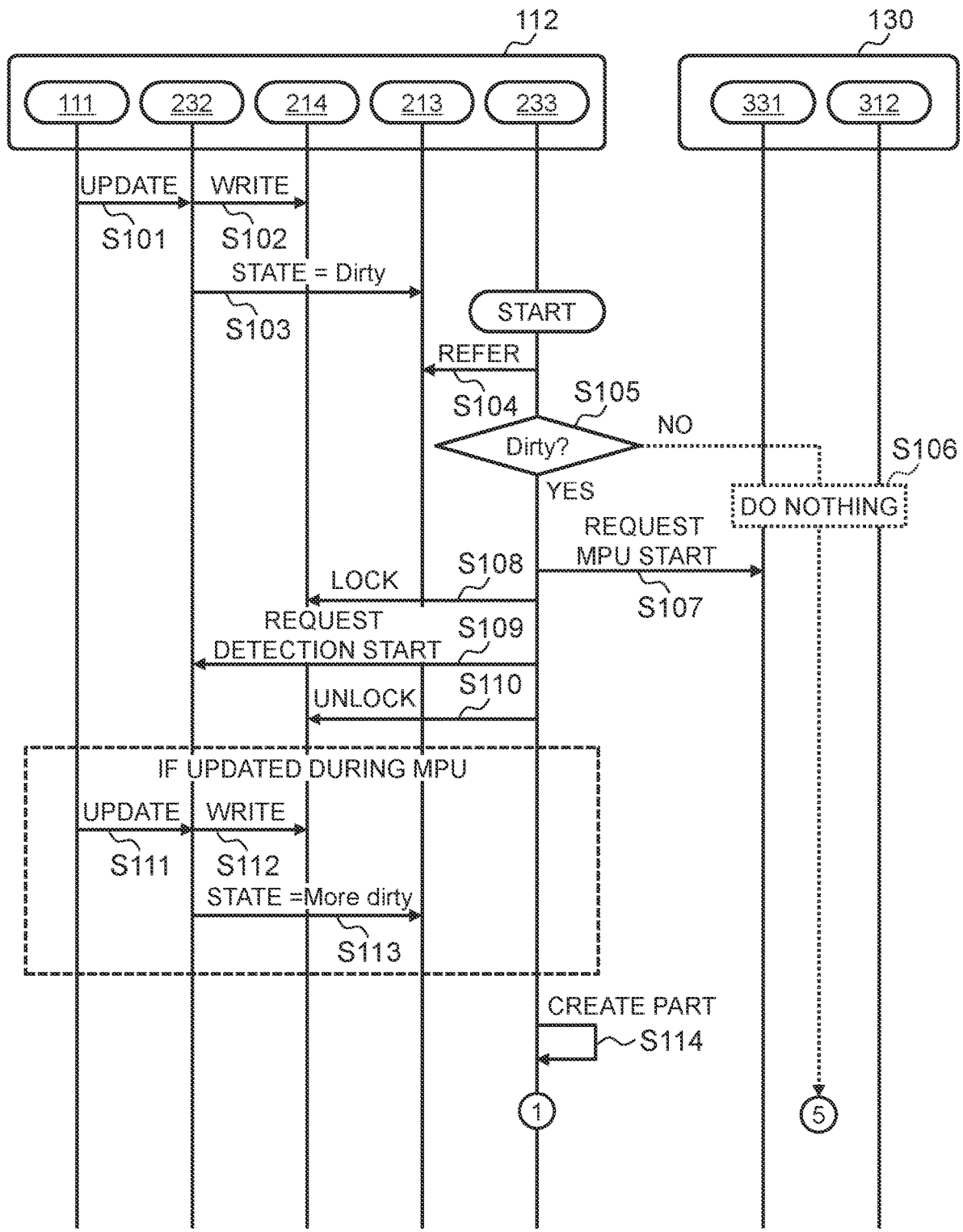
FIG. 10 shows an example of the flow of a start process.

FIG. 10 shows an example of the flow of the start process.

When an update request for a file is issued by the computer 111 (S101), the file is updated by the file system unit 231 in response to the update request (S102). The file designated by the update request is called "target file" in the description with reference to FIGS. 10 to 14.

When the file state represented by the I/O information 213 on the target file is "Clean", the I/O monitor 232 updates the file state to "Dirty" (S103).

The replicator 233 is configured to periodically verify the file state of the target file. The replicator 233 refers to the I/O information 213 on the target file, and determines whether the file state is "Dirty" or not (S105). When the determination result in S105 is false (S105: NO), i.e., when the file state is "Clean", nothing may be performed (S106).

When the determination result in S105 is true (S105: YES), the replicator 233 requests the object storage 130 (object system unit 331) to start MPU of the target file (S107). Accordingly, the object system unit 331 starts MPU of the target file, i.e., prepares reception of a file part. The replicator 233 obtains the lock of the target file (S108), requests the I/O monitor 232 to start detection of update of the target file during MPU (S109) (i.e., the I/O monitor 232 is notified of start of MPU of the target file), and subsequently releases the lock of the target file (S110). For example, the I/O information 213 may include a flag of whether the file is in MPU or not. S109 may change the flag to a value meaning that the file is in MPU.

In MPU of the target file, upon an update request for the target file issued by the computer 111 (S111), the file is updated by the file system unit 231 in response to the update request (S112), and the file state of the target file is updated by the I/O monitor 232 to "More Dirty" (S113). Since the target file is in MPU, the replicator 233 is configured to create a part serving as a transfer target from the target file (S114).

Figure 11:
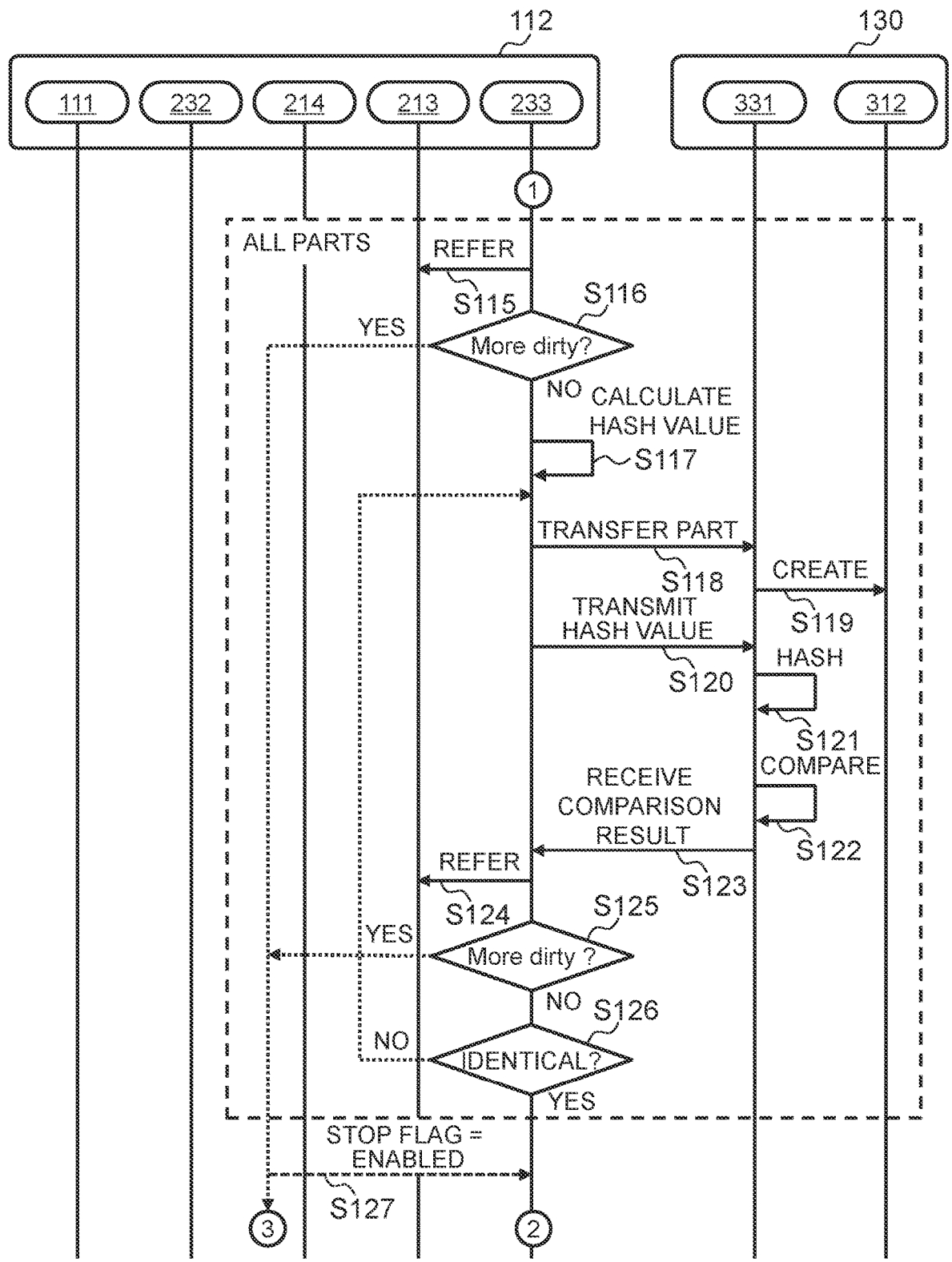
FIG. 11 shows an example of the flow of a transfer process.

FIG. 11 shows an example of the flow of the transfer process.

The replicator 233 is configured to perform S115 to S126 every time the part is created.

That is, the replicator 233 refers to the I/O information 213 on the target file (S115), and determines whether the file state is "More Dirty" or not (S116). S116 is an example of the state determination.

If the determination result in S116 is false (S116: NO), the replicator 233 calculates the hash value of the file part (the part created in S114) (S117). The replicator 233 transfers the file part to the object storage 130 (S118). The object system unit 331 receives the file part, and creates and stores a temporary object that includes the file part (S119). In this case, the object system unit 331 may include information (the start offset and the data length) corresponding to the file part in the part management information 325 on the target file. The replicator 233 transfers the hash value calculated in S117 to the object system unit 331 (S120). The object system unit 331 receives the hash value, calculates the hash value of the file part received in S119 (S121), and compares the calculated hash value with the received hash value (S122). In S121, the object system unit 331 includes the calculated hash value corresponding to the file part in the part management information 325 on the target file.

The replicator 233 receives the comparison result (e.g., both the hash values and/or a result of whether these hash values match with each other or not) from the object system unit (S123). The replicator 233 refers to the I/O information 213 on the target file (S124), and determines whether the file state is "More Dirty" or not (S125). If the determination result in S125 is false (S125: NO), the replicator 233 refers to the comparison result received in S123, and determines whether both the hash values are the same or not (S126). If the determination result in S126 is false (S126: NO), the replicator 233 retransfers the file part to the object storage 130 (S118). In this case, the object created in S119 may be removed. If the determination result in S126 is true (S126: YES), the replicator 233 finishes transfer of this file part.

If the determination result in S116 is true (S116: YES) or the determination result in S125 is true (S125: YES), i.e., if the target file is updated during MPU of the target file and the file state of the target file transitions to "More Dirty" accordingly, the replicator 233 makes the stop flag of the target file "enabled" (e.g., a value "1") (S127). The stop flag of the target file may be included in the I/O information 213 on the target file, or may be present in a place other than that of the I/O information 213.

Figure 12:
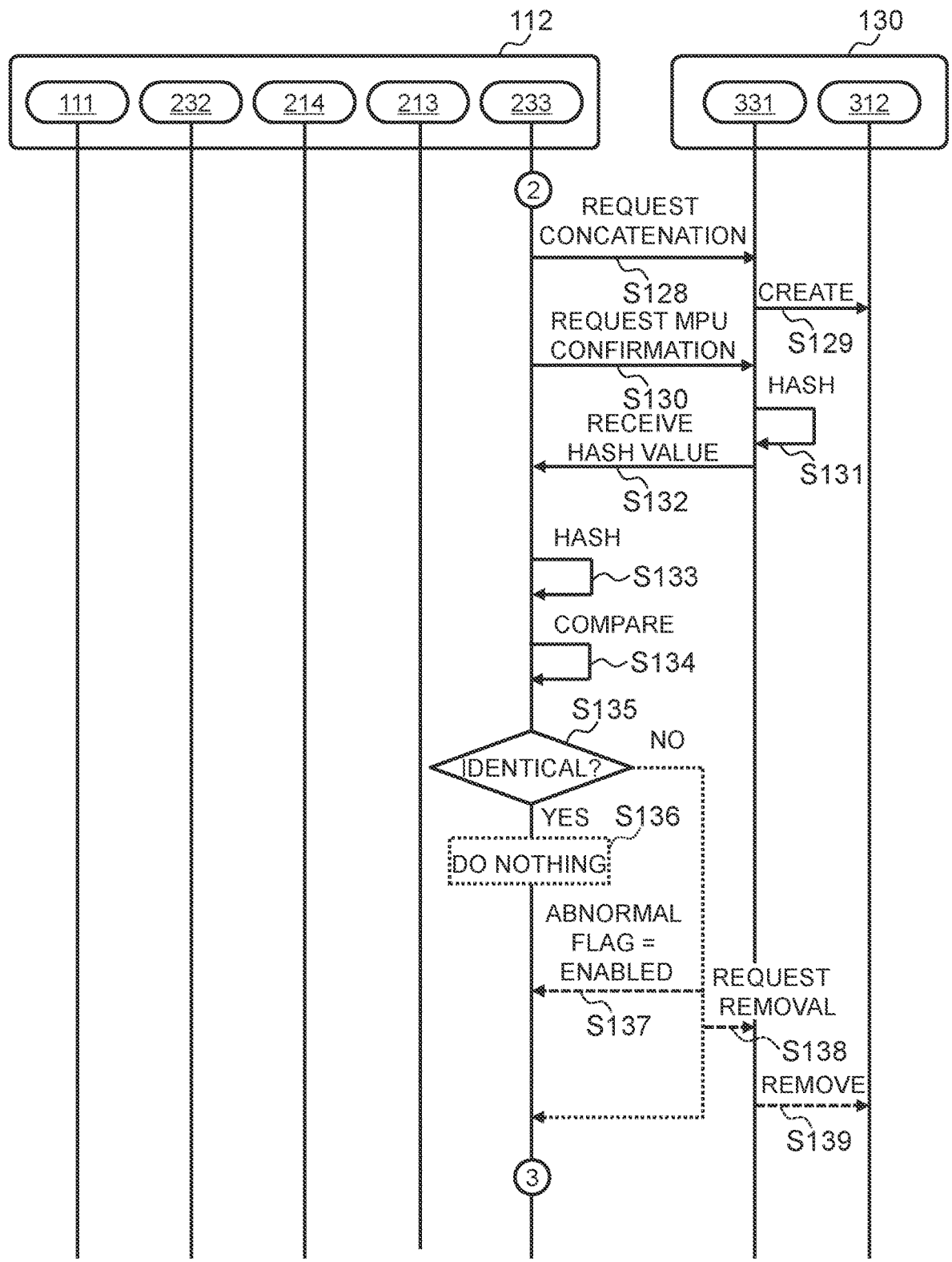
FIG. 12 shows an example of the flow of a concatenation confirmation process.

FIG. 12 shows an example of the flow of the concatenation confirmation process.

When the transfer process for all the file parts of the target file are finished, the replicator 233 requests concatenation from the object storage 130 (object system unit 331) (S128). In response to the request, the object system unit 331 restores the target file by concatenating all the file parts received by the object system unit 331, and creates the object 312 including the target file and stores the object 312 (S129).

The replicator 233 requests confirmation of MPU from the object storage 130 (object system unit 331) (S130). In response to the request, the object system unit 331 calculates the hash value of the restored target file (S131). Specifically, the object system unit 331 obtains the hash value of the target file from the calculated hash value (the hash value in the part management information 325) of each part of the target file. For example, the hash value of the restored target file may be the sum of the hash values of all the parts.

The replicator 233 receives the hash value (the hash value of the target file) calculated in S131 (S132). The replicator 233 calculates the hash value of the target file (S133). In S133, the hash value may be calculated for the entire target file, or calculated using the hash values calculated for the respective parts in FIG. 11 (for example, the hash value of the target file may be the sum of the hash values of all the parts in FIG. 11). The replicator 233 compares the hash value received in S132 with the hash value calculated in S133 (S134), and determines whether both the hash values are the same or not (S135). If the determination result in S135 is true (S135: YES), nothing is performed (S136) and the concatenation confirmation process may be finished.

If the determination result in S135 is false (S135: NO), the replicator 233 makes the confirmation abnormal flag of the target file "enabled" (e.g., a value "1") (S137). The replicator 233 requests the object storage 130 (object system unit 331) to remove the target file object (S138). In response to the request, the object system unit 331 removes the object 312 of the target file (S139). The confirmation abnormal flag of the target file may be included in the I/O information 213 on the target file, or may be present in a place other than that of the I/O information 213.

Figure 13:
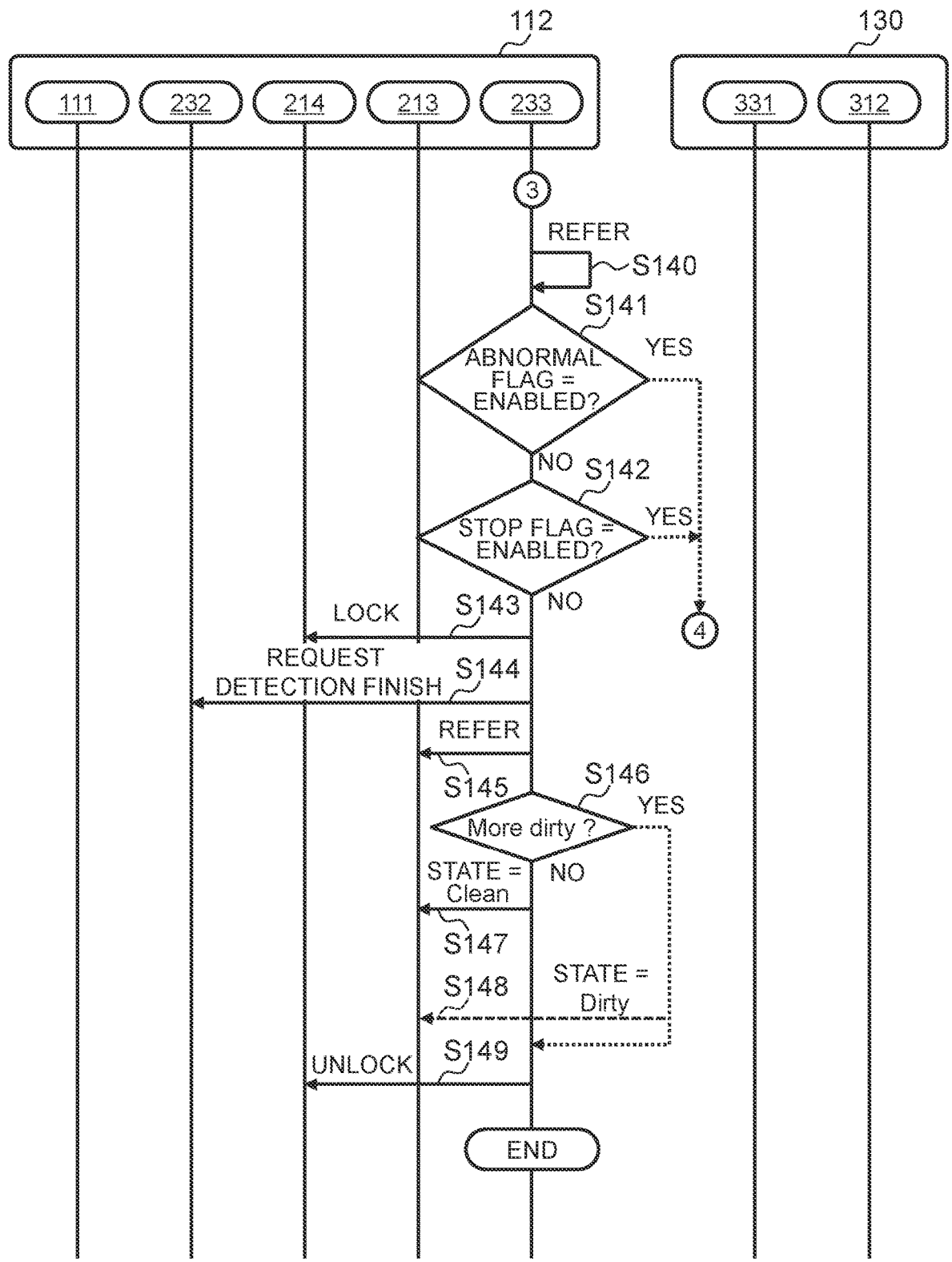
FIG. 13 shows an example of the flow of a post-process.

FIG. 13 shows an example of the flow of the post-process.

The replicator 233 refers to the stop flag and the confirmation abnormal flag of the target file (S140). The confirmation abnormal flag or the stop flag is "enabled" (S141: YES or S142: YES), the post-process is finished.

If either the confirmation abnormal flag or the stop flag is not "enabled" (S141: NO and S142: NO), the replicator 233 obtains the lock of the target file (S143), requests the I/O monitor 232 to stop detection of the target file (S144) (in other words, notifies the I/O monitor 232 that MPU of the target file is finished). For example, the I/O information 213 may include a flag of whether the file is in MPU or not. S144 may change the flag to a value meaning that the file is not in MPU. The replicator 233 refers to the I/O information 213 on the target file (S145), and determines whether the file state is "More Dirty" or not (S146). If the determination result in S146 is false (S146: NO), the replicator 233 updates the file state of the target file to "Clean" (S147) and releases the lock of the target file (S149). If the determination result in S146 is true (S146: YES), the replicator 233 updates the file state of the target file to "Dirty" (S148) and releases the lock of the target file (S149).

Figure 14:
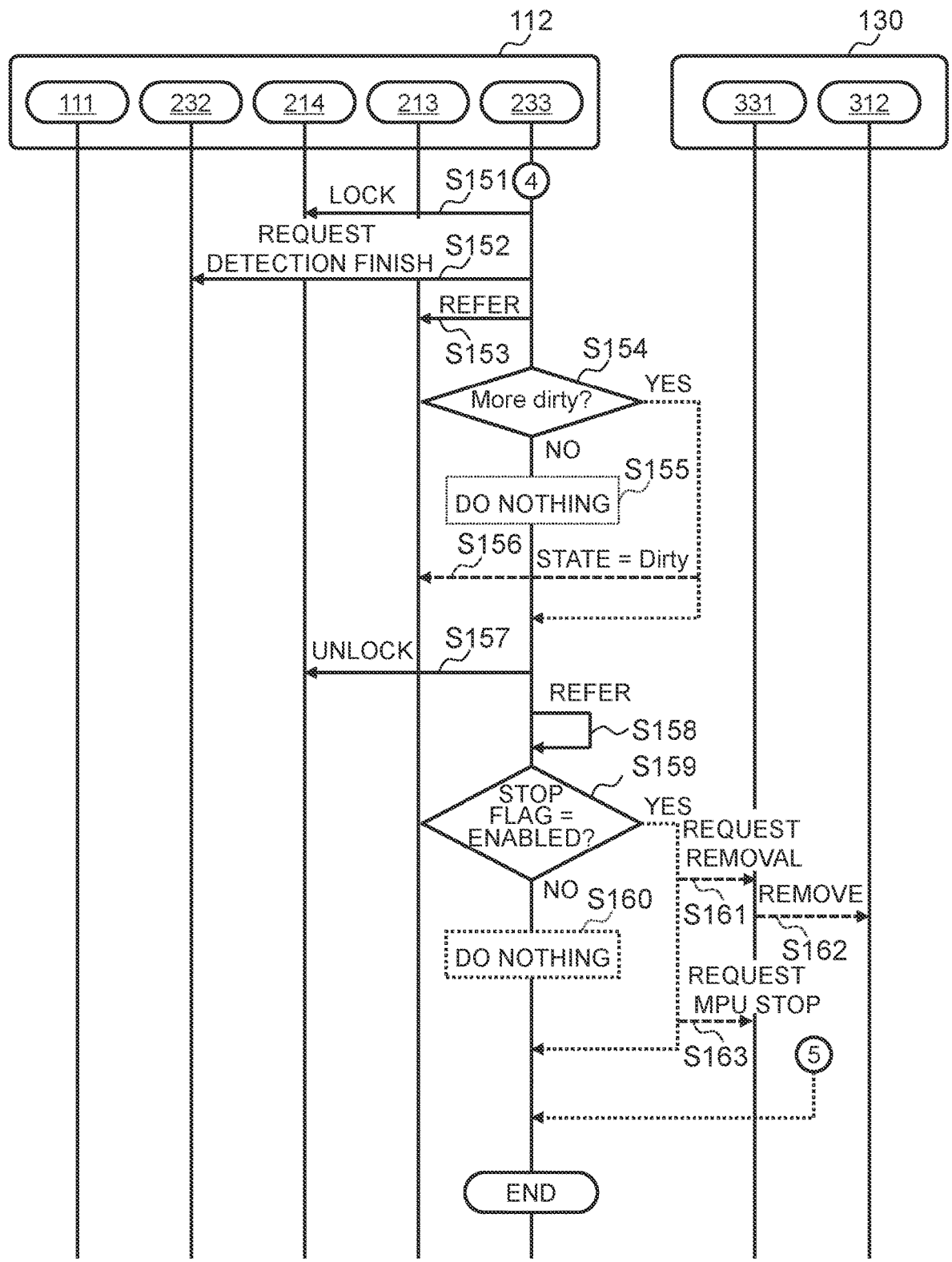
FIG. 14 shows an example of the flow of a stop process.

FIG. 14 shows an example of the flow of the stop process.

The stop process is a process performed if in the post-process the confirmation abnormal flag or the stop process is "enabled" (S141: YES or S142: YES).

The replicator 233 obtains the lock of the target file (S151), and requests the I/O monitor 232 to finish detection of the target file (S152). The replicator 233 refers to the I/O information 213 on the target file (S153), and determines whether the file state is "More Dirty" or not (S154). If the determination result in S154 is false (S154: NO), the replicator 233 does nothing (S155) and releases the lock of the target file (S157). If the determination result in S154 is true (S154: YES), the replicator 233 updates the file state of the target file to "Dirty" (S156) and releases the lock of the target file (S157).

The replicator 233 refers to the stop flag of the target file (S158). If the stop flag is also not "enabled" (S159: NO) nothing is performed (S160) and the stop process is finished.

If the stop flag is also "enabled" (S159: YES), the replicator 233 requests the object storage 130 (object system unit 331) to remove the transmitted part (S161). In response to the request, the object system unit 331 removes the temporary object 312 of the target file (S162). The replicator 233 requests the object storage 130 (object system unit 331) to stop MPU (S163). Accordingly, the object system unit 331 finishes MPU of the target file, i.e., finishes acceptance of a file part.

According to the processes described above, for each part of the target file, the replicator 233 performs part determination that is determination of whether the part concerned matches with the part received by the object storage 130 or not. If the result of the part determination is true, transfer of the part is finished. Accordingly, the matching consistency of data in the object storage 130 can be maintained.

For each part of the target file, the replicator 233 performs the state determination (determination of whether the file state of the target file is "More Dirty" or not) before and after transfer of the part, and performs the part determination if the state determination result is true for every case. Accordingly, execution of the part determination can be limited to a case where repeated MPU is not required. Consequently, it is expected that unnecessary part determination is prevented from being executed.

For each part of the target file, the part determination is determination of whether or not the hash value (an example of a summary) of the part transferred by the replicator 233 matches with the hash value of the part received by the object storage 130. The hash value of the part transferred by the replicator 233 is the hash value calculated by the replicator 233. The hash value of the part received by the object storage 130 is the hash value calculated by the object storage 130. Accordingly, correct part determination is expected. Note that comparison between both the hash values may be performed in any of the file storage 112 and the object storage 130.

After transfer of all the parts of the target file to the object storage 130, the replicator 233 performs entire determination that is determination of whether or not the hash value of the target file matches with the hash value of the file obtained by concatenating all the parts received by the object storage 130. The hash value of the target file is the hash value calculated by the replicator 233 using the calculated hash values of the respective parts of the target file. The hash value of the concatenated file is the hash value calculated by the object storage 130 using the calculated hash values of the respective parts of the target file. Accordingly, the matching consistency of the entire target file can be determined while reducing the calculation load of the hash value of the entire target file.

After transfer of all the parts of the target file to the object storage 130, the replicator 233 performs entire determination that is determination of whether or not the transfer target file transferred by the replicator 233 matches the file obtained by concatenating all the parts received by the object storage 130. Accordingly, the matching consistency of data in the object storage 130 can be maintained.

Although the lock of the target file is sometimes obtained, the duration of the lock only requires short time periods in the I/O monitor 232, such as for setting start/finish of detecting update during MPU, update of the file state, and update of the flag. Accordingly, even if the update disabled time of the target file occurs, the time can be short.

The embodiment and the modification example are thus described. However, these are examples for describing the present invention. There is no intention to limit the scope of the present invention only to these embodiment and modification example. The present invention can be executed in other various embodiments.

For example, in repeated MPU after MPU is stopped, transfer of only part of the file may be adopted instead of transfer of the entire file. For example, the file part information 420 in the I/O information 213 may adopt the part state "Clean" meaning a non-updated and transferred state, or the part state "Dirty" meaning a non-transferred state, on a part-by-part basis. Irrespective of whether MPU is being performed or not, the I/O monitor 232 updates the part state to "Dirty" when the part in the part state "Clean" is updated. In MPU of the updated target file, the replicator 233 transfers only the part in the part state "Dirty" to the object storage 130, and does not transfer the part in the part state "Clean" to object storage 130. Accordingly, the amount of transfer target data can be reduced.

The invention claimed is:

1. A file storage system, comprising:
an interface apparatus coupled to an external storage system;
a storage apparatus that stores one or more files; and
a processor that performs multiple part upload of a transfer target file among the one or more files to the external storage system,
wherein when the transfer target file is updated during the multiple part upload, the processor stops the multiple part upload of the transfer target file, and performs multiple part upload of the updated file to the external storage system,
wherein when the file having already been transferred to the external storage system is updated, the processor updates a file state of the file to a first dirty state, wherein
the file in the first dirty state is the transfer target file,
when the transfer target file is updated during the multiple part upload, the processor updates the file state of the transfer target file to a second dirty state, and
for each part of the transfer target file, the processor,
performs a state determination that is a determination of whether the file state of the transfer target file is the second dirty state or not, and
transfers the part to the external storage system when a result of the state determination is false, or
stops the multiple part upload of the transfer target file when the result of the state determination is true.

2. The file storage system according to claim 1,
wherein for each part of the transfer target file,
the processor performs part determination that is determination of whether the part transferred by the processor, and the part received by the external storage system match with each other or not, and
when a result of the part determination is true, transfer of the part is finished.

3. The file storage system according to claim 2,
wherein for each part of the transfer target file, the processor
performs the state determination before transfer of the part, and
transfers the part and then after transfer of the part, performs the state determination again, when the result of the state determination is true, or
performs the part determination, when a result of the repeated state determination is true.

4. The file storage system according to claim 2,
wherein for each part of the transfer target file,
the part determination is determination of whether a summary of the part transferred by the processor, and a summary of the part received by the external storage system match with each other or not,
the summary of the part transferred by the processor is a summary calculated by the processor, and
the summary of the part received by the external storage system is a summary calculated by the external storage system.

5. The file storage system according to claim 4,
wherein after all parts of the transfer target file are transferred to the external storage system,
the processor performs entire determination that is determination of whether the summary of the transfer target file, and a summary of a file where all parts received by the external storage system are concatenated match with each other or not,
the summary of the transfer target file is a summary calculated by the processor using a calculated summary of each transferred part of the transfer target file,
the summary of the concatenated file is a summary calculated by the external storage system using the calculated summary of each received part of the transfer target file, and
when a result of the entire determination is true, the multiple part upload is finished.

6. The file storage system according to claim 1,
wherein after all parts of the transfer target file are transferred to the external storage system,
the processor performs entire determination that is determination of whether the transfer target file transferred by the processor, and a file where all parts received by the external storage system are concatenated match with each other or not, and
when a result of the entire determination is true, the multiple part upload is finished.

7. The file storage system according to claim 1,
wherein for each part of the transfer target file, the processor manages whether the part is updated or not, and
in multiple part upload of the updated file, the processor transfers uploaded parts in the updated file to the external storage system, and does not transfer non-updated and transferred parts in the updated file to the external storage system.

8. A file storage system, comprising:
an interface apparatus coupled to an external storage system;
a storage apparatus that stores one or more files; and
a processor that performs multiple part upload of a transfer target file among the one or more files to the external storage system,
wherein when the transfer target file is updated during the multiple part upload, the processor stops the multiple part upload of the transfer target file, and performs multiple part upload of the updated file to the external storage system, and
wherein the processor executes a plurality of computer programs and causes the file storage system to function as a file system unit that updates a file, a file transfer unit that performs multiple part upload of a file, and an I/O monitoring unit that monitors I/O (Input/Output) of a file,
the file system unit accepts an update request, and updates a file designated by the update request among the one or more files,
when the file having already been transferred to the external storage system is updated, the I/O monitoring unit updates a file state of the file to a first dirty state,
the file in the first dirty state is the transfer target file,
when the file transfer target file is updated during the multiple part upload, the I/O monitoring unit updates a file state of the transfer target file to a second dirty state, and
for each part of the transfer target file, the file transfer unit
performs a state determination that is a determination of whether the file state of the transfer target file is the second dirty state or not, and
transfers the part to the external storage system when a result of the state determination is false, or
stops the multiple part upload of the transfer target file when the result of the state determination is true.

9. A file transfer method, comprising:
causing a computer to perform multiple part upload of a transfer target file among one or more files to an external storage system;
causing the computer to update the transfer target file when there is an update request for the transfer target file;
upon possible update of the transfer target file during the multiple part upload, causing the computer to stop the multiple part upload of the transfer target file and performing multiple part upload of the updated file to the external storage system, and
when the file having already been transferred to the external storage system is updated, causing the computer to update a file state of the file to a first dirty state, wherein
the file in the first dirty state is the transfer target file,
when the transfer target file is updated during the multiple part upload, the method further includes causing the computer to update the file state of the transfer target file to a second dirty state, and
for each part of the transfer target file, causing the computer to
perform a state determination that is a determination of whether the file state of the transfer target file is the second dirty state or not, and
transfer the part to the external storage system when a result of the state determination is false, or
stop the multiple part upload of the transfer target file when the result of the state determination is true.

* * * * *